(12) United States Patent
Frehel et al.

(10) Patent No.: US 8,091,197 B2
(45) Date of Patent: Jan. 10, 2012

(54) DEVICE AND PROCESS FOR ASSEMBLING ORIENTED OBJECTS

(75) Inventors: Francois Frehel, Saint Dolay (FR); Christian M. Schmit, legal representative, Bordeaux (FR); Roger Thierry, Guerande (FR); Christophe Gauthier, Saint Brevin (FR)

(73) Assignee: Airbus France, Toulouse (FR)

( * ) Notice: Subject to any disclaimer, the term of this patent is extended or adjusted under 35 U.S.C. 154(b) by 497 days.

(21) Appl. No.: 11/577,930

(22) PCT Filed: Oct. 7, 2005

(86) PCT No.: PCT/FR2005/050828
§ 371 (c)(1),
(2), (4) Date: Apr. 25, 2007

(87) PCT Pub. No.: WO2006/045969
PCT Pub. Date: May 4, 2006

(65) Prior Publication Data
US 2009/0249602 A1   Oct. 8, 2009

(30) Foreign Application Priority Data
Oct. 25, 2004   (FR) .................................... 04 52435

(51) Int. Cl.
*B23P 19/10*   (2006.01)
(52) U.S. Cl. ....................................... 29/281.5; 269/37

(58) Field of Classification Search .................... 269/37, 269/45; 29/281.5; 108/103, 185, 140, 143
See application file for complete search history.

(56) References Cited

U.S. PATENT DOCUMENTS

| 341,662 | A | * | 5/1886 | Kirkland ......................... 269/45 |
| 3,772,753 | A | | 11/1973 | Sargeant |
| 3,870,288 | A | | 3/1975 | McLarnon |
| 4,641,819 | A | | 2/1987 | Poland |

FOREIGN PATENT DOCUMENTS

| DE | 43 34 116 A1 | 4/1995 |
| JP | 11-58074 | 3/1999 |
| SU | 770727 | 10/1980 |

* cited by examiner

*Primary Examiner* — Lee D Wilson
*Assistant Examiner* — Jamal Daniel
(74) *Attorney, Agent, or Firm* — Perman & Green, LLP

(57) ABSTRACT

A device and a method for assembling oriented objects, such as parts of a pipeline. The device includes means for rotational displacement about a rotational axis of a first and second base. The first base has a first main axis which is perpendicular to the rotational axis and includes first means for supporting objects that can be displaced in translation along the first main axis. The second base has a second main axis which is perpendicular to the rotational axis and includes second means for supporting objects and a revolving plate device for supporting and orienting one of the objects in an angular manner. The revolving plate device can be displaced in translation in relation to the second supporting means along the second main axis. Visualization means enable at least the rotational angle of the plate and the position of the second base to be visualised.

11 Claims, 4 Drawing Sheets

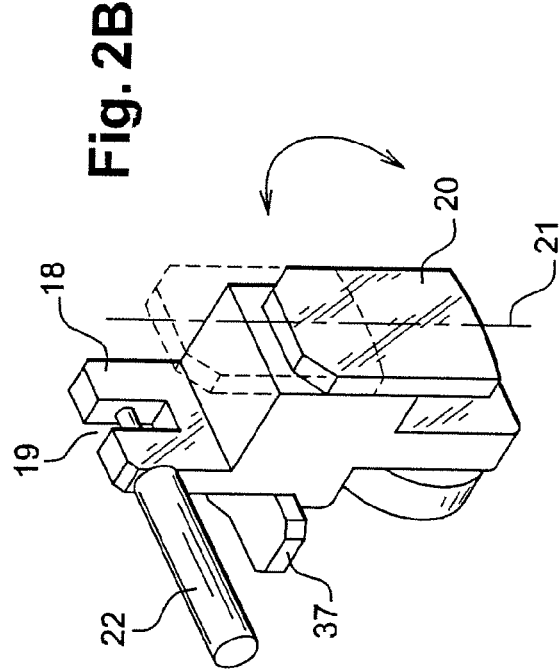
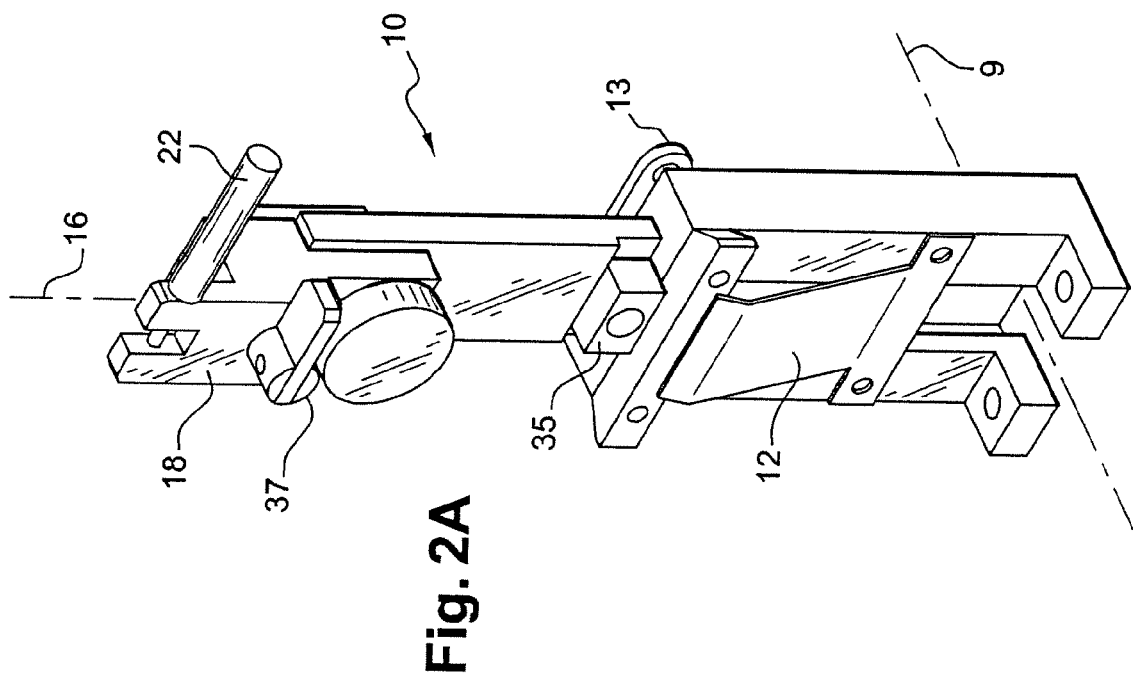

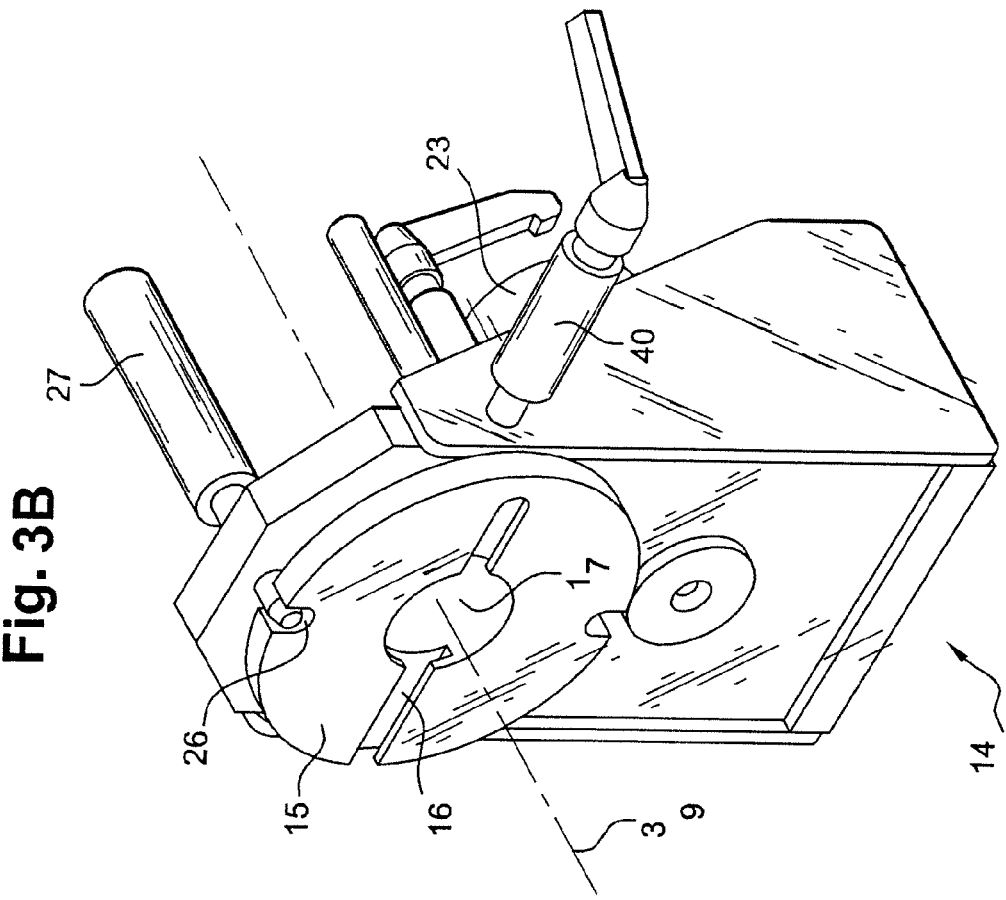
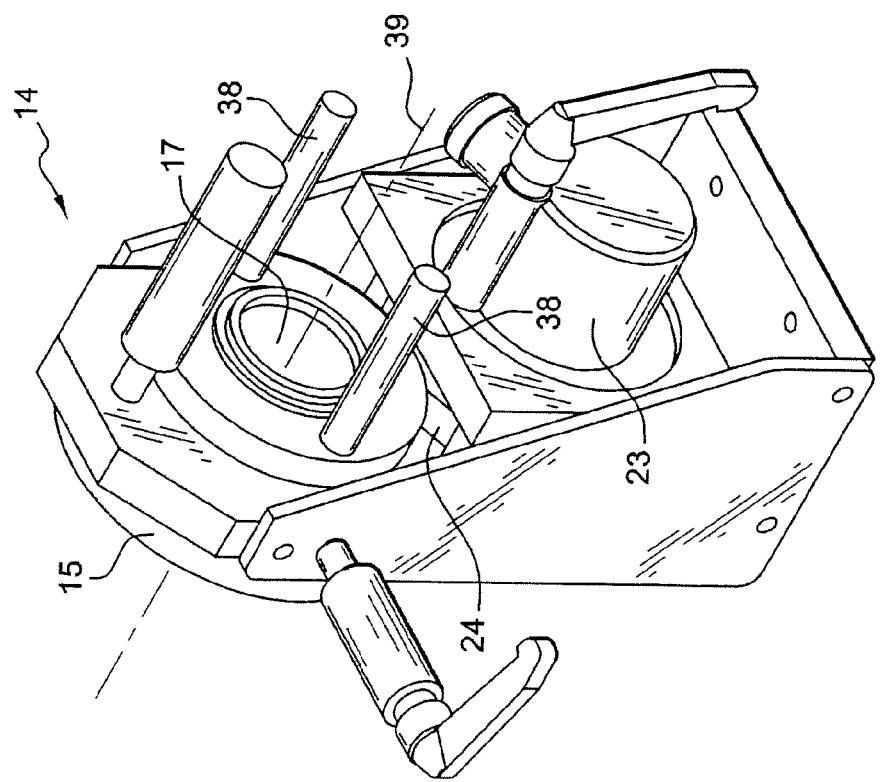

DEVICE AND PROCESS FOR ASSEMBLING ORIENTED OBJECTS

This application is the National Stage of International Application No. PCT/FR2005/050828, International Filing Date, 7 Oct. 2005, which designated the United States of America, and which international application was published under PCT Article 21(2) as WO Publication No. WO 2006/045969 and which claims priority from French Application No. 0452435, filed 25 Oct. 2004.

The disclosed embodiments relate to a device and a process for the assembly of oriented objects.

BACKGROUND

An airliner conceals a particularly complex assembly of pipes serving for the routing of gases or liquids, for example for cooling engines, fuel supply, hydraulic brake system, etc. The various elements comprising these pipe networks must have very particular forms in order to mate to the contours of an airplane, and must have a strong resistance to pressure.

The assembly of these elements requires the manufacture of an assembly dummy specific to this pipe network. Any final evolution in the three-dimensional geometry of this pipe network therefore requires the creation of a new installation dummy. Now, the development time for a new airplane or a new solution tends to be short, rendering incompatible the time needed for manufacturing a new tooling with the time for creating a new pipe network.

Moreover, new airplane programs favor the use of oriented couplings allowing the prediction of a significant cost increase for the assembly dummies as well as the surface necessary for storing these dummies and the costs associated with this storage.

SUMMARY

The object of the disclosed embodiments is therefore to propose a device and a process for the assembly of oriented objects, such as parts of a pipe network, simple in their design and in their operating mode, economical and permitting the assembly of at least two objects oriented relative to one another regardless of the assembly geometry.

Another object of the disclosed embodiments seeks to facilitate and increase the efficiency of the development and assembly operations in space of these oriented objects.

For this purpose, the disclosed embodiments relate to a device for the assembly of oriented objects, such as parts of a pipe network. According to the disclosed embodiments, this device comprises:

means for moving a first base and a second base in rotation around an axis of rotation, said first base having a first principal axis perpendicular to the axis of rotation and comprising first support means for these oriented objects, the first support means being mobile in translation along the first principal axis, the second base having a second principal axis perpendicular to the axis of rotation and comprising second support means for these objects and a revolving stage device designed to support and angularly orient one of said objects.

the revolving stage device being mobile in translation relative to the second support means along the second principal axis, and means for visualizing at least the angle of rotation of the stage and the position of the second base.

In different particular embodiments of the device for assembling oriented objects, each having its particular advantages and subject to numerous possible technical combinations:

the revolving stage comprises a T-shaped groove arranged so as to permit support of a centering element, the centering element comprises an opening with axis parallel to the surface of the revolving stage and fastening means to receive an adaptor joined to one of the objects, the first support means are mobile in rotation around an axis perpendicular to the first principal axis, and in translation along this perpendicular axis, and the second support means are mobile in translation along an axis perpendicular to the second principal axis, the revolving stage device comprises means for driving the revolving stage in rotation, the drive means comprise a stepping motor and a worm, the revolving stage device cooperates with the second support means to define an assembly zone for the objects, the second support means comprise a first fixed stop wall having a slot designed to receive one of the objects, a second stop wall parallel to the first wall and at a distance from the latter, the second wall being mobile in translation along an axis perpendicular to the second principal axis, the means for moving in rotation around the first and second bases comprise a graduated circular stage, the rotation axis being perpendicular to the surface of the stage and passing through its center, the device comprises a table with a flat surface, this surface bearing a network of openings and a third support means for the objects, the circular stage being fixed in the extension of the table, the visualization means comprise an encoder coupled to means for driving the revolving stage in rotation and a display unit.

The disclosed embodiments also relate to an assembly process for oriented objects, such as pipe network parts. According to the disclosed embodiments, an assembly reference plane and an orientation plane are defined, these planes being perpendicular to one another, and then the following steps are conducted:

a) a first point of a first object to be assembled is placed in the reference plane on first support means and a second point near one end of the first object is placed on second support means, the first object being then contained between these two points in the assembly reference plane, b) a second object to be assembled is mounted on a revolving stage device and this revolving stage is moved angularly to orient the second object relative to the orientation plane, the reference plane containing an axis of this second object, c) an assembly zone for the objects is determined by moving the revolving stage device in translation towards the second support means along a common axis parallel to the reference plane; the first support means, on the one hand, and the second support means and the revolving stage device, on the other hand, are mobile in rotation around the same rotation axis perpendicular to the reference plane, the first support means being mobile in translation along an axis perpendicular to the rotation axis, d) these objects are assembled by crimping, welding, or the like, thus a system of Cartesian coordinates (x, y, z) is defined by assigning the origin (0, 0, 0) of this system to a centering point of this first assembly, steps a), b), c) and d) may be repeated in order to join a new object to the assembly previously obtained, the visualization means permitting giving Cartesian coordinates (x, y, z) to these elements so as to permit their orientation in space relative to an assembly geometry.

In different embodiments, the disclosed embodiments also relates to the following characteristics, which will be considered alone or according to all of their technically possible combinations:

the centering point is placed at the intersection of the reference and orientation planes, the origin being assigned so that another axis of the second object is contained in the orientation plane, the visualization means give at least the rotation angle of the revolving stage and the position of the common axis linking the revolving stage device and the second support means.

The device and the assembly process for objects oriented relative to one another such as described previously can advantageously be used for airplane or ship pipe networks.

BRIEF DESCRIPTION OF THE DRAWINGS

The disclosed embodiments will be described in more detail by reference to the attached drawings, in which:

FIG. 2 is a schematic representation of the second support means (FIG. 2a) and an enlarged view of the upper part of these second support means with their pivoting stop (FIG. 2b) according to one embodiment of the disclosed embodiments;

FIG. 3 is a schematic representation of the revolving stage device of FIG. 1 in a rear profile view (FIG. 3a) and in a front profile view (FIG. 3b);

DETAILED DESCRIPTION

Figure 1:
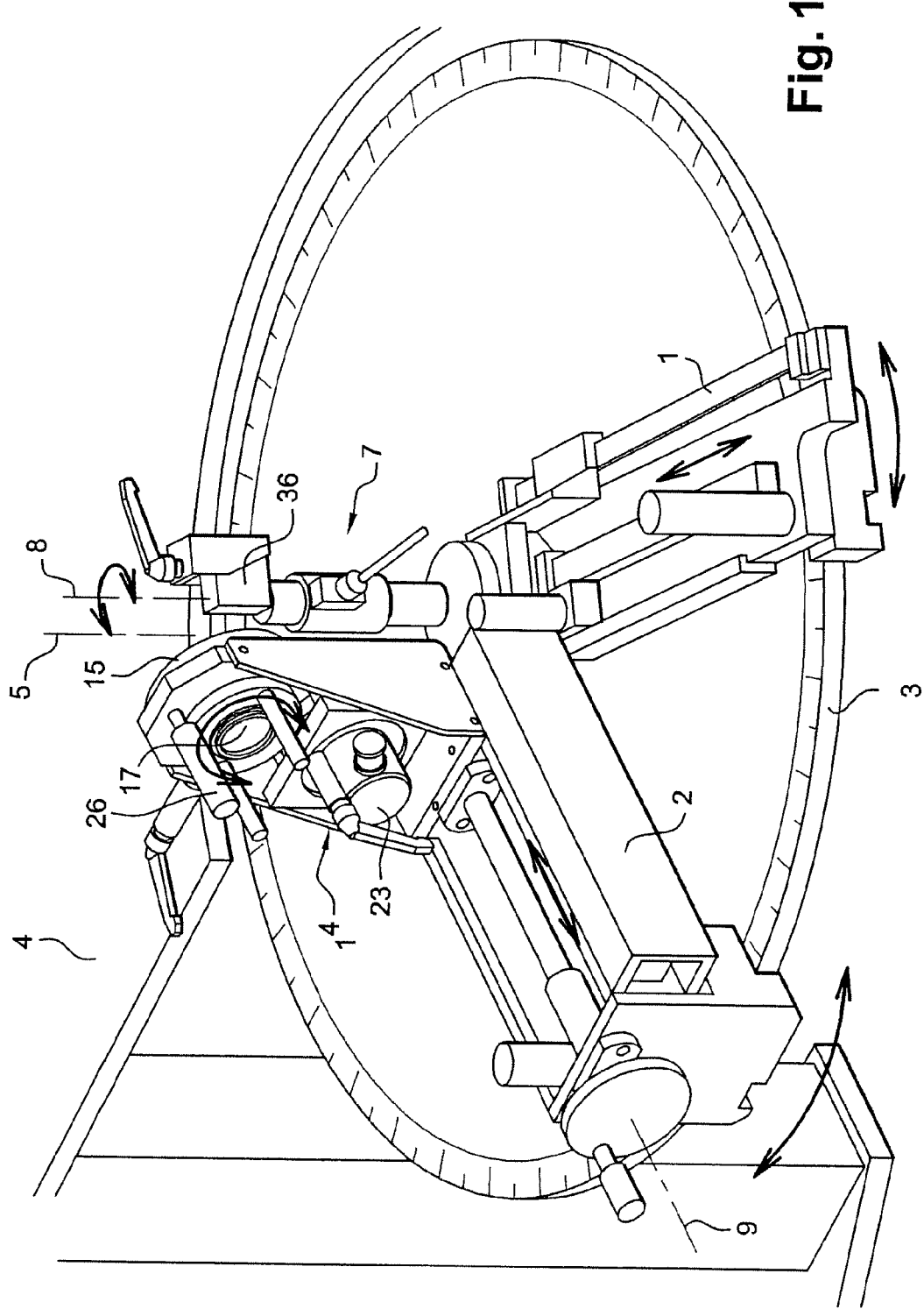
FIG. 1 is a schematic representation of the device for assembling oriented objects according to one embodiment of the disclosed embodiments.

FIG. 1 shows a device for the assembly of oriented objects according to one particular embodiment of the disclosed embodiments. This device comprises means for movement of a first base 1 and a second base 2 in rotation around an axis of rotation. Advantageously, these means for movement in rotation comprise a graduated circular stage fastened to a table at holes 4 so that this table constitutes a continuity of graduated stage 3. Rotation axis 5 is perpendicular to the surface of graduated stage 3 and passes through its center. Thus the movement of first base 1 and second base 2 is circularly coaxial to the center of stage 3. In FIG. 1, the first and second bases 1, 2 have one of their ends in movement over a part of the circumference of graduated circular stage 3. Of course, this stage 3 can have at least one opening in the form of an arc of a circle whose center is merged with that of graduated stage 3 but having a smaller diameter. This opening in the form of an arc of a circle can, for example, receive the end of first base 1, while the end of second base 2 can move around the periphery of graduated stage 3. The means for moving first and second bases 1, 2 in rotation can also comprise means for driving said bases 1, 2 in rotation, for example, a gear system and a stepping motor controlled by a control device.

First base 1 has a first principal axis 6 perpendicular to rotation axis 5 passing through the center of graduated stage 3. This first principal axis 6 is contained in a plane parallel to the surface of graduated stage 3. First base 1 comprises first support means 7 for the objects. These first support means 7 are mobile in translation along first principal axis 6. Preferentially, they are also mobile in rotation around an axis 8 perpendicular to first principal axis 6 and in translation along this perpendicular axis 8 to assure a total freedom of orientation and positioning of first support means 7 relative to the object to be supported. First base 1 comprises, in a particular embodiment, a rail containing first principal axis 6 and on which a platform can move in translation. A first cylindrical tube is fastened to this platform, for example by screws, said cylindrical tube having axis 8 perpendicular to principal axis 6 for its axis of symmetry. A second tube at least partially hollowed out in the direction of its height, and able to move in translation along the first cylindrical tube, comprises locking means, for example a handle, to fix its position along the first tube. The part of the second tube not hollowed out bears holding means 36, for example a metal clamp that can receive an object, for example a pipe, and means for solidly locking this object in position inside these holding means. Alternatively, it can also be a telescopic mast bearing holding means at its upper end. These holding means are mounted in rotation on the second tube or on the upper end of the telescopic mast.

Second base 2 has a second principal axis 9 perpendicular to the axis of rotation 5, and which is therefore also contained in a plane parallel to the surface of graduated stage 3. Second base 2 comprises second support means 10 for objects, receiving, for example, a part close to one end of a first object to be assembled. These second support means 10 are advantageously mobile in translation along an axis 11 perpendicular to second principal axis 9 (FIG. 2a). These second support means 10 are moved in translation by a spring blade 12. A locking device 13 comprising two screws, for example, permits holding the second support means 10 in position. A position stop 35 determines a minimum elevation of these second support means 10.

Second base 2 also comprises a revolving stage device 14 designed to support and angularly orient a second object to be assembled.

In a preferred embodiment according to FIG. 3, revolving stage 15 comprises a T-shaped groove 16 arranged so as to permit supporting a centering element for the object to be assembled. Opening 17 centered on revolving stage 15 advantageously permits centering the second object to be assembled and positioning it relative to the end of the first object, supported by second support means 10. This centering element comprises an opening with an axis parallel to the surface of revolving stage 15 and fastening means to receive an adaptor associated with the second object. Revolving stage device 14 is mobile in translation relative to second support means 10 along second principal axis 9. The revolving stage device can also move along a guide rail containing second principal axis 9. The guide rail presented in FIG. 1 is formed by a cylindrical bar and the walls of second base 2.

Revolving stage device 14 can comprise means for driving revolving stage 15 in rotation. These drive means, comprise, for example, a stepping motor and a worm, and advantageously also comprise reducers. Alternatively, these drive means comprise at least one handle 38 permitting manually moving revolving stage 15 around its axis of rotation 39.

Revolving stage device 14 cooperates with second support means 10 to define an assembly zone for the first and second objects. According to FIG. 2b), second support means 10 comprise a first fixed stop wall 18 having a slot 19 designed to receive one of the objects, and a second stop wall 20 parallel to first wall 18 and spaced from this wall by a distance d. Second wall 20 is mobile in translation along an axis 21 perpendicular to second principal axis 9 so that it can be raised or lowered to be made to face toward (dashed-line wall) or away from (solid-line wall) slot 19 of first wall 18. A handle 37 permits, for example, manually moving this second wall 20 into a high or low position. The first object to be assembled is positioned in slot 19 of second support means 10 so that its end abuts on second wall 20, this wall being kept in high position. Then, this first object is fixed in position by fastening means 22. Then, second wall 20 is lowered into a low position, and revolving stage device 14 is moved in translation along second principal axis 9 towards second support means 10. One end of the first object to be assembled then abuts first wall 18 of second support means 10 by overlapping the end of the first object and thus defining an assembly zone, for example for crimping, of length d.

Revolving stage 15 is advantageously movable in translation along rotation axis 39. A handle 40 permits locking revolving stage 15 in translation along axis 39. This locked position on axis 39 serves as a reference position during positioning and clamping the elements to be assembled. Revolving stage 15 is then released before conducting the assembly operation, for example, by crimping, in order to permit the elongation brought about by this crimping.

The device for assembling oriented objects also comprises visualization means for at least the stage rotation angle and the position of the second base. These visualization means comprise, for example, an encoder 23 coupled to means for driving revolving stage 15 in rotation and a display unit. Digital encoder 23 and the means for driving in rotation can be securely connected by gears 24 (FIG. 3a). A slot 25* made in revolving stage 15 permits zeroing digital encoder 23 (FIG. 3b), by means of an indexing handle 26**.

The disclosed embodiments also relate to an assembly process for oriented objects, such as parts of a pipe network. First of all, an assembly reference plane 27 and an orientation plane 28 are defined, these planes 27, 28 being perpendicular to one another. Then the following steps are conducted:

a) a first point 29 of a first object to be assembled 30 is placed in reference plane 27 on first support means 7 and a second point 31 is placed near one end of first object 30 on second support means 10, first object 30 being thus contained between these two points 29, 30* in assembly reference plane 27.

b) a second object to be assembled 32 is mounted on revolving stage device 14 and this revolving stage 15 is moved angularly to orient second object 32 relative to orientation plane 28, reference plane 27 containing an axis of this second object 32, c) an assembly zone for the objects is determined by moving revolving stage device 14 in translation towards second support means 10 along a common axis 9 parallel to reference plane 27, first support means 7, on the one hand, and second support means 10 and revolving stage device 14, on the other hand, being mobile in rotation around the same rotation axis perpendicular to reference plane 27, the first support means being mobile in translation along an axis perpendicular to the axis of rotation, d) these objects are joined by crimping, welding, or the like.

After this first assembly, a Cartesian coordinate system (x, y, z) is defined by assigning the origin (0, 0, 0) of this system to a centering point 33 of this first assembly. Advantageously, centering point 33 is placed at the intersection of reference plane 27 and orientation plane 28, the origin being set so that another axis 34 of second object 32 is contained in orientation plane 28.

Steps a), b), c) and d) may be repeated to join a new object to the previously obtained assembly, the visualization means permitting assigning coordinates (x, y, z) to these elements so as to permit their orientation in space relative to an assembly geometry.

Figure 4:
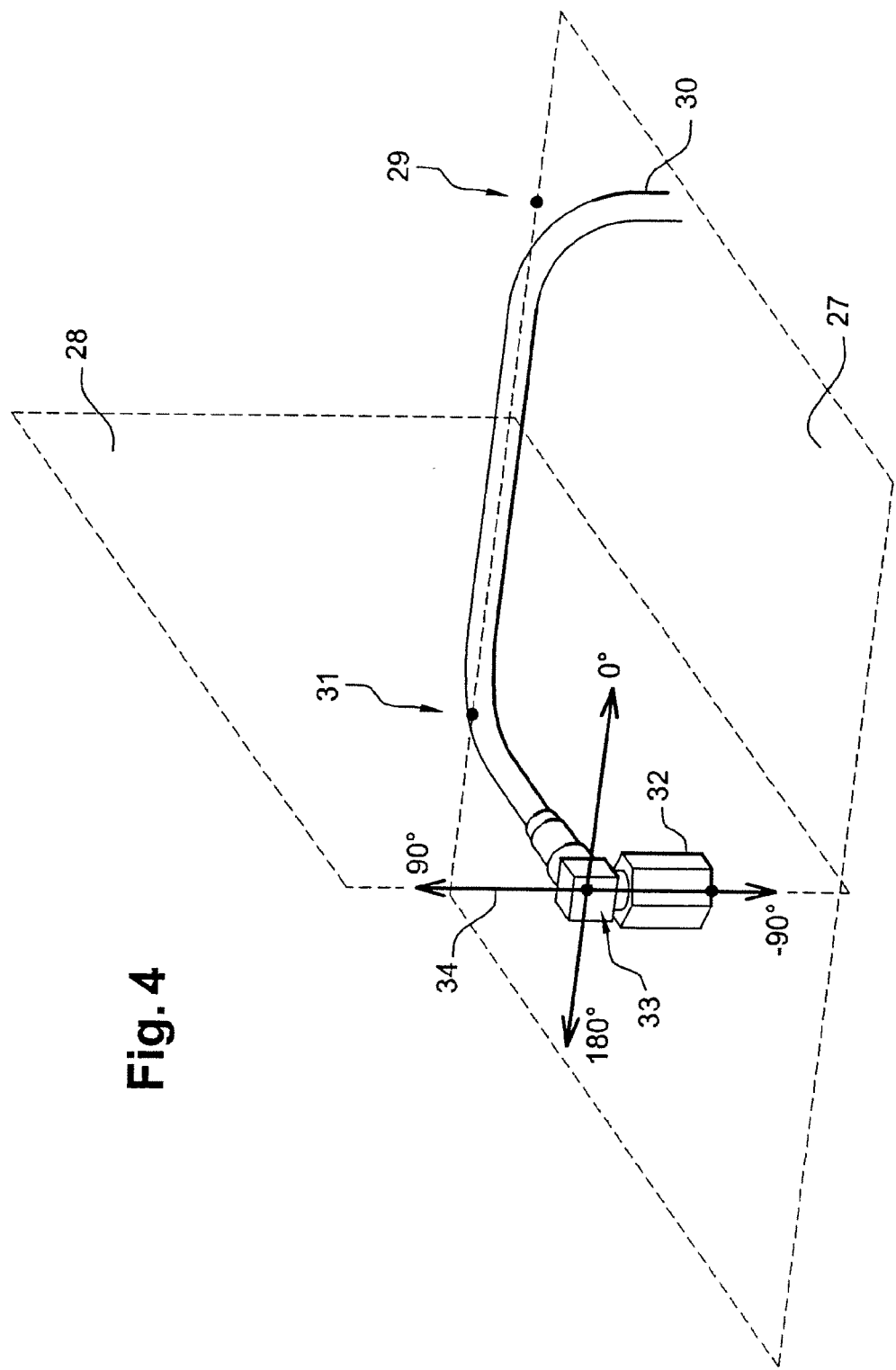
FIG. 4 is a schematic representation of an assembly referenced by a system of Cartesian coordinates (x, y, z) according to one embodiment of the disclosed embodiments.

Purely by way of illustration and in one mode of implementation for assembling a pipe network with oriented couplings, FIG. 4 shows a schematic representation of the reference and orientation planes after crimping the first coupling on a first pipe. Reference plane 27 comprises the first bend coming after the joined end of the first pipe. The bending angle can be comprised between 0° and 180°. The length of the final pipe network comprising up to 9 bends, for example, can reach 4 meters for a tube diameter ranging from 6.25 mm to 25.4 mm.

The invention claimed is:

1. A device for assembling oriented objects comprising:
   means for moving a first base and a second base in rotation around a rotation axis,
   said first base and second base being independently movable of each other in rotation around said rotation axis, said means for moving the first base and second base comprising a graduated circular plate having a rotation axis perpendicular to its surface so that the movement of the first base and the second base is circularly coaxial,
   said first base having a first principal axis perpendicular to said rotation axis and comprising first support means for said objects, said first support means being mobile in translation along the first principal axis,
   said second base having a second principal axis perpendicular to said rotation axis and comprising second support means for said objects and a rotating-plate device having a plate mobile in rotation,
   said rotating-plate device being mobile in translation relative to said second support means along the second principal axis,
   and means for displaying at least the angle of the plate of the rotating-plate device and the position of the second base on the circular plate.

2. The device according to claim 1, further wherein the rotating plate comprises a T-shaped groove formed so as to enable a centering element to be supported.

3. The device according to claim 2, wherein said centering element comprises an orifice with an axis parallel to the surface of the rotating plate and fixing means for receiving an adapter associated with one of said objects.

4. The device according to claim 1, wherein said first support means is able to move in rotation about an axis perpendicular to said first principal axis and in translation along this perpendicular axis, and in that said second support means is able to move in translation along an axis perpendicular to said second principal axis.

5. The device according to claim 1, wherein the rotating-plate device comprises means of driving the rotating plate in rotation.

6. The device according to claim 5, wherein said driving means comprises a stepping motor and a worm.

7. The device according to claim 5, wherein the display means comprises encoder coder coupled to said means of driving the rotating plate in rotation and a display box.

8. The device according to claim 1, wherein said rotating-plate device cooperates with said second support means in order to define an assembly zone for said objects.

9. The device according to claim 8, wherein said second support means comprises a first fixed stop wall comprising a slot intended to receive one of said objects, a second stop wall parallel to first wall and spaced apart from the latter, said second wall being able to move in translation along an axis perpendicular to said principal axis.

10. The device according to claim 1, wherein the means of moving the first and second bases in rotation comprise a graduated circular plate, said rotation axis being normal to the surface of said plate and passing through its center.

11. The device according to claim 10, wherein it comprises a table comprising a flat surface, said surface supporting said objects, said circular plate being fixed in line with said table.

* * * * *

UNITED STATES PATENT AND TRADEMARK OFFICE
CERTIFICATE OF CORRECTION

PATENT NO. : 8,091,197 B2
APPLICATION NO. : 11/577930
DATED : January 10, 2012
INVENTOR(S) : Frehel, Deceased et al.

Page 1 of 1

It is certified that error appears in the above-identified patent and that said Letters Patent is hereby corrected as shown below:

First Page, Column 1, Line 1, (75) Inventors, delete "Frehel" and insert -- Frehel, Deceased --, therefor.

First Page, Column 1, Line 5, (75) Inventors, delete "Gauthier" and insert -- Gautier --, therefor.

Signed and Sealed this
Seventeenth Day of April, 2012

David J. Kappos
*Director of the United States Patent and Trademark Office*